United States Patent
Lu et al.

(10) Patent No.: US 11,097,221 B2
(45) Date of Patent: Aug. 24, 2021

(54) DIRECT GAS CAPTURE SYSTEMS AND METHODS OF USE THEREOF

(71) Applicant: 8 Rivers Capital, LLC, Durham, NC (US)

(72) Inventors: Xijia Lu, Durham, NC (US); Jeremy Eron Fetvedt, Raleigh, NC (US); Brock Alan Forrest, Durham, NC (US); Glenn William Brown, Jr., Durham, NC (US); Mohammad Rafati, Durham, NC (US); Scott Thomas Martin, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 16/593,197

(22) Filed: Oct. 4, 2019

(65) Prior Publication Data
US 2020/0108346 A1    Apr. 9, 2020

Related U.S. Application Data

(60) Provisional application No. 62/741,803, filed on Oct. 5, 2018, provisional application No. 62/800,908, filed on Feb. 4, 2019.

(51) Int. Cl.
*B01D 53/62* (2006.01)
*B01D 53/02* (2006.01)
(Continued)

(52) U.S. Cl.
CPC .......... *B01D 53/78* (2013.01); *B01D 53/02* (2013.01); *B01D 53/62* (2013.01); *B01D 53/96* (2013.01);
(Continued)

(58) Field of Classification Search
None
See application file for complete search history.

(56) References Cited

U.S. PATENT DOCUMENTS

| 4,069,117 | A | 1/1978 | Cooper |
| 2010/0137457 | A1 | 6/2010 | Kaplan |
| 2017/0327421 | A1* | 11/2017 | Heidel ............... B01D 53/1475 |

FOREIGN PATENT DOCUMENTS

| JP | 2004-174369 | 6/2004 |
| WO | WO 2009/039445 | 3/2009 |

(Continued)

OTHER PUBLICATIONS

Keith et al., "A Process for Capturing CO2 From the Atmosphere," *Joule 2*, 2018, pp. 1573-1594.

*Primary Examiner* — Daniel Berns
(74) *Attorney, Agent, or Firm* — Womble Bond Dickinson (US) LLP

(57) ABSTRACT

The present disclosure provides systems and methods that combine direct capture of one or more moieties from a gaseous mixture with one or both of calcium oxide production and power production. The systems and methods can utilize combinations of a capture unit, a regeneration unit, a calcination unit, a slaking unit, a heat exchange unit, a separation unit, and a power production unit. The present disclosure provides the ability to remove carbon dioxide and other moieties from air or other gaseous mixtures in a truly carbon negative manner by utilizing electricity from a power production unit that is operated in a carbon neutral or carbon negative manner and simultaneously provide useful products, such as calcium oxide and calcium hydroxide.

20 Claims, 3 Drawing Sheets

(51) Int. Cl.
    *B01D 53/34*     (2006.01)
    *B01D 53/78*     (2006.01)
    *B01D 53/96*     (2006.01)
    *C01B 32/50*     (2017.01)
    *C04B 2/10*     (2006.01)
    *C04B 2/08*     (2006.01)
    *F01N 5/02*     (2006.01)

(52) U.S. Cl.
    CPC ................ *C01B 32/50* (2017.08); *C04B 2/08* (2013.01); *C04B 2/104* (2013.01); *F01N 5/02* (2013.01); *B01D 2251/304* (2013.01); *B01D 2251/306* (2013.01); *B01D 2251/604* (2013.01); *B01D 2251/606* (2013.01); *B01D 2257/504* (2013.01); *B01D 2258/06* (2013.01); *C01B 2210/0007* (2013.01)

(56) References Cited

FOREIGN PATENT DOCUMENTS

| | | |
|---|---|---|
| WO | WO 2011/088515 | 7/2011 |
| WO | WO 2015/109190 | 7/2015 |

\* cited by examiner

DIRECT GAS CAPTURE SYSTEMS AND METHODS OF USE THEREOF

CROSS-REFERENCE TO RELATED APPLICATIONS

The present application claims priority to U.S. Provisional Patent Application No. 62/741,803, filed Oct. 5, 2018, and U.S. Provisional Patent Application No. 62/800,908, filed Feb. 4, 2019, the disclosures of which are incorporated herein by reference.

FIELD OF THE DISCLOSURE

The present disclosure relates to systems and methods capture of one or more moieties from a gaseous mixture, particularly with capture of at least carbon dioxide from air, while simultaneously generating one or more commodities, such as chemical compositions, heat, and/or electrical power.

BACKGROUND

More emphasis continues to be placed on the desire to reduce adverse effects associated with the presence of various moieties in atmospheric air. To address this desire, there have been various methods proposed for reducing emission of such moieties. Various obstacles, however, continue to exist that prevent significant implementation of sufficient means for reducing emissions on a world-wide scale to meet desired reduction levels. One option for addressing this deficit includes not only reducing emissions of undesired moieties into the atmosphere but actually removing some content of such moieties from atmospheric air.

Direct air capture (DAC) can encompass various technologies for capturing various moieties (particularly carbon dioxide) directly from atmospheric air and providing a concentrated stream of the captured moieties for sequestration or utilization. DAC technology is still minimally implemented for various reasons, such as a high cost associated with the technology and the inability to economically couple DAC with other useful technologies. Accordingly, there remains a need in the field for further systems and methods for achieving direct air capture of carbon dioxide as well as other moieties directly from atmospheric air and for providing the captured moieties for further uses.

SUMMARY OF THE DISCLOSURE

The present disclosure relates to systems and methods for direct capture of at least one moiety (e.g., $CO_2$) from air or another gaseous stream with one or both of simultaneous power production and CaO generation. The systems and methods thus can include a variety of elements and process steps as otherwise described herein, said variety of elements and process steps being capable of implementation in any order and number as would be evident based upon a holistic reading of the present disclosure.

In one or more embodiments, the present disclosure provides a system for direct capture of one or more moieties from a gaseous mixture with one or both of simultaneous power production and CaO generation. A system for direct capture of a moiety, such as $CO_2$, can comprise a number of components, units, or other elements.

The direct gas capture system can include, for example, any combination of at least one air contacting unit, at least one pump/compressor, at least one regeneration unit, at least one calcination unit, at least one slaking unit, one or more mixing tanks, one or more heat exchangers, one or more coolers, one or more splitters, one or more unions, and any number of lines useful for passage of various streams between said components, units, or elements. An air separation unit may also be included in the combined system.

In some embodiments, the direct gas capture system can be integrated with a power production. Such integrated power production system can include, for example, at least one heat source (e.g., a combustor, a solar heater, heat transfer from a steam stream), at least one power producing turbine, at least one generator, at least one heat exchanger, at least one separator, at least one compressor and/or pump, at least one splitter, at least one union, and any number of lines useful for passage of various streams between said components, units, or elements.

It is understood that the direct gas capture system can simultaneously provide capture of at least one gaseous moiety and one or both of CaO cogeneration and integrated power production. This integration/cogeneration can be achieved, for example, in that one or more streams passing through one or more lines may be integrated into at least two of the noted systems. In this manner, for example, heat produced in one system may be transferred for use in the other system. Likewise, electricity generated in the power production system may be directly utilized by the direct gas capture system and/or the CaO generation system. The present systems and methods thus benefit from the one or more outputs (e.g., CaO, $Ca(OH)_2$, and the like) being useful as commodities to offset the cost associated with direct gas capture. Moreover, the present systems and methods may be combined with existing CaO production systems to create an overall carbon neutral facility. Even further, the ability to utilize heat generated in the calcium looping process to provide at least part of the heating for the power production cycle can provide for high efficiency, particularly in light of the ability to substantially or completely eliminate the need for $CO_2$ capture from the power production system and/or the CaO generation process.

The present systems and methods are beneficial at least in part because of the ability to utilize substantially carbon free power in carrying out direct capture of one or more moieties. By eliminating emissions associated with power production it is possible to increase the effective amount of gas capture achieved relative the actual capital expense investment since there is no additional cost for handling power plant emissions. Furthermore, the heat integration that is enabled between the gas capture system and the power plant results in a net improvement in energy use per unit of carbon captured since more electricity can be produced. This synergy is based on the integration of heat recovery given the regeneration of CaO and not the use of the caustic capture agent.

In some embodiments, direct capture of one or more gaseous moieties with simultaneous CaO production can be advantages because of the ability to utilize the heat generated in the processes for further purposes, such as to raise steam and produce the needed power. Heat sources in the process can include the flue gas from the calcination unit, heat generated in the slaking unit, heat from an ASU, and/or heat from a turbine exhaust in an associated power cycle. The method can comprise, for example, contacting air (or another gaseous stream) with a caustic agent that is effective to react with at least one moiety (e.g., $CO_2$) in the air or other gaseous stream and thereby remove at least a portion of the at least one moiety from the air or other gaseous stream. The method thereafter can comprise regenerating the caustic agent to form at least one stream comprising at least CaO and the at least one moiety, whereby said regenerating includes heat production. The method also can comprise recovering at least a portion of the heat produced in the regenerating and applying the recovered heat to a closed loop power production cycle. The method thus can result in the capture of the at least one moiety that is removed from the air or other gaseous stream as well as the production of at least on commodity, such as the CaO.

The system can comprise: an air capture plant; a calciner; at least one heat recovery unit; and a closed loop power generation unit. In one or more further embodiments, the system can be defined in relation to one or more of the following statements, which can be combined in any number and order.

The system can further comprise a water or steam slaker that can be configured to convert CaO to $Ca(OH)_2$.

The air capture plant can be configured for utilizing a caustic agent for reacting with the one or more moieties in an air stream.

The calciner can be configured for regeneration of the caustic agent.

The at least one heat recovery unit can include one or more components configured for cooling of recovered solids and gases from the calciner.

The closed loop power generation unit can include at least one or more heat recovery turbines and optionally one or more heat exchangers, compressors, pumps, and additional heat sources.

The system can be configured such that an external heat source from one or more further processes can be directed into the regeneration process, such as to reduce fuel consumption for the regeneration of the caustic agent.

In some embodiments, the present disclosure particularly can provide a system for direct capture of carbon dioxide from air with simultaneous power production and generation of one or both of calcium oxide and calcium hydroxide. As a non-limiting example embodiment, such system can comprise: a capture unit configured for receiving an alkali solvent and air and providing an intermediate product incorporating carbon dioxide removed from the air; a regeneration unit configured for receiving the intermediate product incorporating the carbon dioxide and a stream of calcium hydroxide and providing a stream of the alkali solvent and a stream comprising calcium carbonate; a calcination unit configured for receiving the stream comprising calcium carbonate and heating the calcium carbonate to form calcium oxide and provide a heated gas stream; a slaking unit configured for receiving a portion of the calcium oxide and water and providing the stream of calcium hydroxide that is received by the regeneration unit; a heat recovery unit configured to receive the heated gas stream from the calcination unit and provide a cooled gas stream; and a power production unit configured to receive heat provided from one or more of the calcination unit, the heat recovery unit, and the slaking unit. In further embodiments, such system may be defined in relation to one or more of the following statements, which may be combined in any order.

The power production unit can be a closed loop power production unit.

The power production unit can be a semi-closed loop power production unit.

The semi-closed loop power production unit can be configured for repeated compression and expansion of a carbon dioxide working fluid.

The system further can comprise a separator configured to receive the cooled gas stream from the heat exchange unit and provide a stream of substantially pure carbon dioxide.

In one or more embodiments, the present disclosure provides a method for direct air capture of one or more moieties with one or both of simultaneous power production and generation of one or both of CaO and $Ca(OH)_2$. The method can comprise: contacting air or another gaseous stream with a caustic agent that is effective to react with at least one moiety in the air or other gaseous stream and thereby remove at least a portion of the at least one moiety from the air or other gaseous stream; regenerating the caustic agent to form at least one stream comprising at least one of CaO and $Ca(OH)_2$ and also the at least one moiety, whereby said regenerating includes heat production; recovering at least a portion of the heat produced in the regenerating; and applying at least a portion of the recovered heat to a closed loop power production cycle.

More particularly, in some embodiments, the present disclosure can provide a method for direct capture of carbon dioxide from air with simultaneous power production and generation of one or both of calcium oxide and calcium hydroxide. As a non-limiting example embodiment, such method can comprise: contacting air with an alkali solvent in a contacting unit under conditions effective to react the alkali solvent with carbon dioxide in the air and form an intermediate product incorporating the carbon dioxide removed from the air; regenerating the alkali solvent in a regenerating unit by reacting the intermediate product incorporating the carbon dioxide with calcium hydroxide to form a regenerated alkali solvent and form calcium carbonate; heating the calcium carbonate in a calcination unit to form calcium oxide and provide a heated gas stream; reacting a portion of the calcium oxide with water to form calcium hydroxide, at least a portion which is passed to the regenerating unit; withdrawing heat from the heated gas stream to form a cooled gas stream; and using at least a portion of the heat withdrawn from the heated gas stream or a heated solids stream to heat one or more streams in a power production unit. In further embodiments, such method may be further defined in relation to one or more of the following statements, which may be combined in any number or order.

The alkali solvent can comprise one or both of potassium hydroxide and sodium hydroxide.

The intermediate product can comprise one or both of potassium carbonate and sodium carbonate.

The method can comprise recycling at least a portion of the regenerated alkali solvent back to the contacting unit.

Heating the calcium carbonate in the calcination unit can comprise injecting a fuel and an oxidant into the calcination unit under conditions effective to at least partially combust the fuel to produce heat.

The method further can comprise injecting a stream of makeup calcium carbonate into the calcination unit.

The method further can comprise exporting a portion of the calcium oxide formed in the calcination unit as a calcium oxide product stream.

The calcination unit can be operated at a temperature of 700° C. to about 1300° C.

The method further can comprise passing the heated gas stream or the cooled gas stream to a separation unit and forming a substantially pure stream of carbon dioxide.

The method further can comprise compressing at least a portion of the substantially pure stream of carbon dioxide to a pressure of about 20 bar to about 200 bar.

The method further can comprise cooling at least a portion of the formed calcium oxide prior to reacting a portion of the calcium oxide with water to form calcium hydroxide.

The slaking unit can be operated in a temperature range of about 125° C. to about 600° C.

Withdrawing heat from the heated gas stream to form a cooled gas stream can comprise passing the heated gas stream through a heat exchanger where heat is withdrawn therefrom.

At least a portion of the heat that is withdrawn from the heated gas stream in the heat exchanger can be used for pre-heating the calcium carbonate entering the calcination unit.

The calcium carbonate can be heated up to a temperature of about 400° C. to about 800° C.

Using at least a portion of the heat withdrawn from the heated gas stream or the heated solids stream to heat one or more streams in the power production unit can comprise using one or more exhaust streams in a gas phase or a solid phase from the slaking unit to transfer heat to one or more streams in the power production unit.

The method further can comprise using electricity generated in the power production unit to supply at least a portion of an electrical load requirement necessary for operation of at least the contacting unit.

The power production unit can be a closed loop power production unit or a semi-closed loop power production unit.

The power production unit can be the semi-closed loop power production unit and is configured for repeated compression and expansion of a carbon dioxide working fluid.

The contacting unit can include a solid state absorbent unit, and wherein the air used in the contacting unit can be first passed through the solid state absorbent unit.

The air used in the contacting unit can be first compressed in an air separation unit prior to being passed to the contacting unit.

The air separation unit can be used to produce oxygen for one or both of the power production unit and the calcination unit.

The power production unit can include a power production turbine, and wherein all or part of an exhaust stream from the power production turbine can be used to provide heating for the calcination unit.

DETAILED DESCRIPTION OF THE DISCLOSURE

Figure 1:
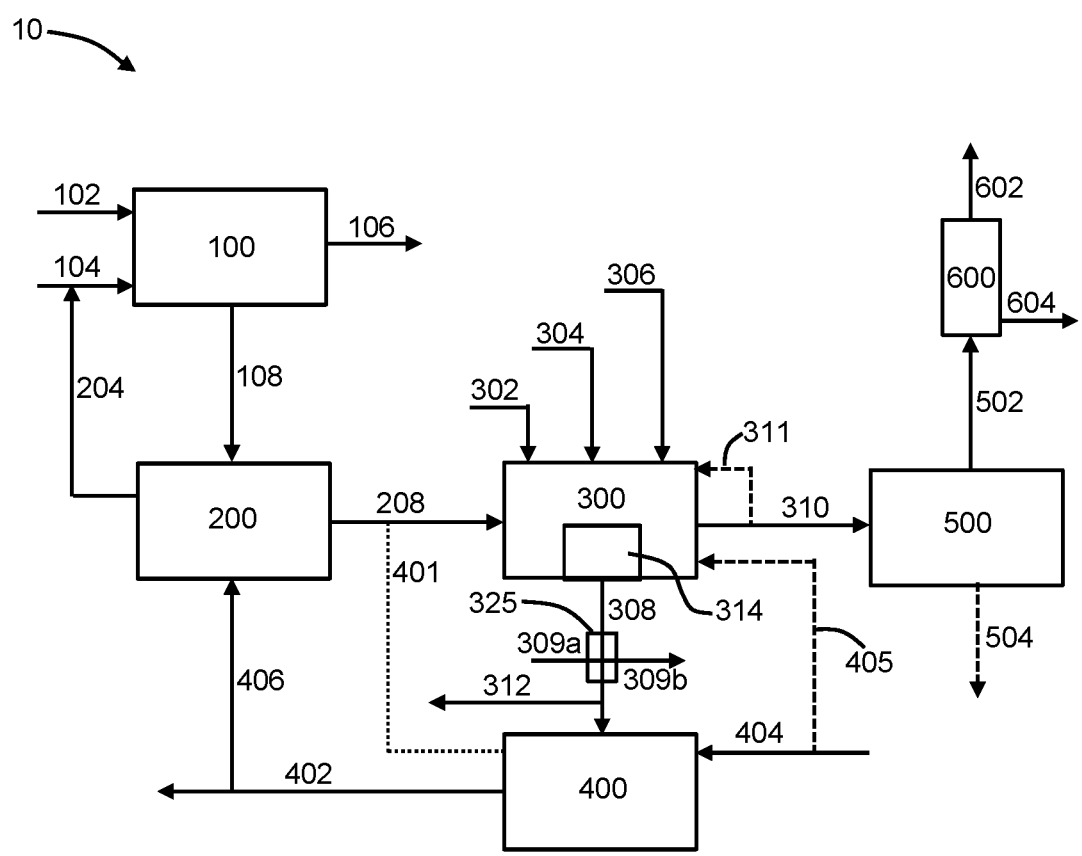
FIG. 1 is a diagram of a system adapted to or configured to remove one or more moieties from a gaseous mixture with associated calcium oxide generation according to example embodiments of the present disclosure.

The present disclosure provides systems and methods useful for direct capture of one or more moieties from a gaseous mixture. Such systems and methods particularly can use suitable solvents to withdraw the one or more moieties from one or more gaseous mixture(s). In some embodiments, the gaseous mixture may be atmospheric or ambient air, diluted ambient air, enriched ambient air, and/or a combustion exhaust gas. As such, the gaseous mixture may contain various mixtures containing any combination of, for example nitrogen, oxygen, carbon dioxide, nitrogen oxides (NOx), sulfur oxides (SOx), carbon monoxide, noble gases, and the like. A combustion exhaust gas more specifically may include a flue gas from a combustion process wherein a fuel has been combusted using air, oxygen enriched air, or substantially pure oxygen as an oxidant source. Other combustion gases, such as exhaust from an automobile, may also be a source of the gaseous mixture.

Although the present disclosure is not necessarily so limited, the systems and methods described herein can be particularly useful in the removal of carbon dioxide ($CO_2$) from a gaseous mixture. As such, the further disclosure herein may be exemplified in relation to the specific removal of carbon dioxide from a gaseous mixture. Such exemplification is not intended to limit the scope of the disclosure, and it is understood that such disclosure may be applied to the removal of further chemical moieties from one or more gaseous mixtures.

Any solvent suitable for withdrawing a chemical moiety from a gaseous mixture may be used according to the present disclosure. The solvent may particularly be a material that is adapted to or configured to react with one or more chemical moiety in the gaseous mixture to form an intermediate product. Preferably, the solvent is a material that is adapted to or configured to be regenerated by reacting the intermediate product with calcium oxide or calcium hydroxide. In some embodiments, the solvent may comprise an alkali solvent, which may more particularly be a basic, metal salt solution. Various hydroxide solutions, for example, may be used. As non-limiting examples, potassium hydroxide (KOH), sodium hydroxide (NaOH), and like solvents may be used.

In order to exemplify the present disclosure, in one or more embodiments, the capture of carbon dioxide (or other chemical moieties) can arise through the following reaction, where M is a metal species:

$$2MOH+CO_2=H_2O+M_2CO_3. \quad (1)$$

Where M is potassium, for example, the reaction may be as shown below.

$$2KOH+CO_2=H_2O+K_2CO_3. \quad (2)$$

KOH can be regenerated through a calcium looping process or cycle as shown below.

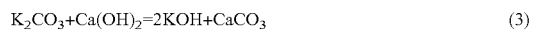
$$K_2CO_3+Ca(OH)_2=2KOH+CaCO_3 \quad (3)$$

$$CaCO_3=CaO+CO_2 \quad (4)$$

$$CaO+H_2O=Ca(OH)_2 \quad (5)$$

In formula (3) above, the alkali solvent (e.g., potassium hydroxide) is regenerated through reaction of the alkali metal carbonate (e.g., potassium carbonate) with calcium hydroxide ($Ca(OH)_2$). This reaction also provides calcium carbonate ($CaCO_3$) as a product. As shown in formula (4), the calcium carbonate can be subject to a calcination reaction to drive off carbon dioxide (e.g., as a flue gas) and form calcium oxide (CaO), also known as quicklime. Referring to formula (5), the quicklime can be reacted with water in a so-called slaking reaction to form calcium hydroxide for recycle back into formula (3). The presently disclosed systems and methods utilize this calcium looping process in a manner not heretofore recognized whereby capture of one or more moieties from a gaseous mixture may be achieved at reduced cost and/or with improved efficiency. In particular, the present disclosure provides systems and methods that are beneficial for removal of carbon dioxide from a variety of gaseous mixtures including, but not limited to, ambient air or atmospheric air. The means for achieving such results are further described herein.

Referring to FIG. 1, the present disclosure provides a system 10 that is configured for achieving direct capture of one or more moieties, particularly carbon dioxide, from an input gaseous mixture, which specifically can include ambient air or atmospheric air. The system 10 is further configured for cogeneration of quicklime.

In one or more embodiments, the gaseous mixture can be input in line 102 to a contacting unit 100 along with an alkali solvent in line 104. As noted above, the alkali solvent may include, for example potassium hydroxide or sodium hydroxide, which are particularly beneficial for capturing carbon dioxide from a gaseous mixture. The contacting unit 100 may comprise, for example, an air/liquid contactor wherein the gaseous mixture is passed across or through the alkali (liquid) solvent such that one or more moieties, particularly carbon dioxide, reacts with the solvent to form a stable intermediate. Referring back to formula (2), where potassium hydroxide is used as the liquid solvent, carbon dioxide in the gaseous mixture may react with the potassium hydroxide to form potassium carbonate, which is a stable intermediate. In exemplary embodiments, an aqueous solution of KOH or NaOH can be used for capturing carbon dioxide from a gaseous mixture by spraying the aqueous solution to make contact with the gaseous mixture in, for example, an air contactor. In some embodiments, the gaseous mixture may be preheated prior to being input to the contacting unit 100 through gaseous mixture line 102. For example, the gaseous mixture in line 102 may be at a temperature of greater than ambient and up to about 150° C. In further embodiments, the gaseous mixture in line 102 may be at a temperature of about 50° C. to about 150° C., about 75° C. to about 150° C., about 100° C. to about 150° C., or about 130° C. to about 150° C. Low grade heat may be utilized for heating the gaseous mixture to be delivered through line 102 to the contacting unit 100, and such low grade heat may come, for example, from a turbine exhaust stream in a related power production process (as further described below) and/or from an air separation unit (ASU) utilized to provide substantially pure oxygen to such related power production process. Heating is not required in some embodiments and, as such, the gaseous mixture in line 102 may be substantially at ambient temperature, such as about 15° C. to about 40° C., about 18° C. to about 35° C., or about 20° C. to about 30° C. In some embodiments, a solid state $CO_2$ absorbent may be utilized in the contacting unit 100.

A contactor unit exit stream in line 106 exits that contacting unit 100 and generally can comprise a depleted gaseous mixture that is depleted in the moiety that was capture in the contacting unit. For example, in embodiments wherein carbon dioxide is captured, the contactor unit exit stream 106 can be a $CO_2$ depleted gas, such as $CO_2$ depleted air where ambient air is used as the gaseous mixture in line 102. Where the gaseous mixture is ambient air or atmospheric air, the contactor unit exit stream in line 106 may be simply exhausted to the atmosphere. If the gaseous mixture in line 102 is, for example, a flue gas, the depleted gas exiting in line 106 may be transferred to a further treatment unit if necessary for further removal of one or more chemical moieties.

In addition to the foregoing, a product stream including the stable intermediate product exits the contacting unit 100 through line 108. The stable intermediate in line 108 can be, for example, potassium carbonate and/or calcium carbonate. The stable intermediate exiting the contacting unit 100 through line 108 is passed to a regeneration unit 200 for regeneration of the initial alkali solvent. Referring to formula (3) above, the stable intermediate (e.g., $K_2CO_3$) reacts with calcium hydroxide in the regeneration unit 200 to form potassium hydroxide, which exits in line 204 for recycling back to the contacting unit 100, and to form calcium carbonate, which exits in line 208. Any suitable reactor may be utilized in the regeneration unit 200. For example, the regeneration unit 200 may utilize a slurry pellet reactor, a fluidized bed reactor, or a constantly stirred reactor.

In some embodiments, it can be useful to utilize further chemical moiety removal properties of the potassium carbonate and/or sodium carbonate exiting the contacting unit 100. For example, prior to KOH/NaOH regeneration, $K_2CO_3$ and/or $Na_2CO_3$ solution can be used to remove $CO_2$ from, for example, a combustion flue gas. This may be carried out, for example, in a direct contact reactor. Such reaction can result in the formation of $KHCO_3$ and/or $NaHCO_3$. Potassium hydroxide and/or sodium hydroxide may then be regenerated by reacting the $KHCO_3/NaHCO_3$ with $Ca(OH)_2$ in the regeneration unit 200 as shown below in formulas (6) and (7).

$$K_2CO_3 + 2CO_2 + H_2O = 2KHCO_3 + CO_2 \quad (6)$$

$$KHCO_3 + Ca(OH)_2 = CaCO_3 + KOH + H_2O \quad (7)$$

The calcium carbonate exiting in line 208 is passed to a calcination unit 300 for formation of quicklime. As illustrated in FIG. 1, the calcium carbonate in line 208 may be heated utilizing heat from the slaking unit 400. This may be achieved through heat transfer and/or by passage of at least a portion of the calcium carbonate from line 208 through the slaking unit 400, as illustrated by line 401.

The calcination unit 300 can comprise any suitable reactor, furnace, or the like. For example, the calcination unit 300 can be a shaft furnace, rotary kiln, multiple hearth furnace, fluidized bed reactor, transport reactor, or a bubbling bed reactor, or the like that is adapted to or configured to receive the calcium carbonate, fuel, and an oxidant to heat the calcium carbonate and form quicklime. As seen in FIG. 1, fuel is passed to the calcination unit 300 through fuel line 302, and the fuel may include any suitable, combustion fuel, such as natural gas, syngas, liquefied petroleum gas (LPG), hydrogen, coal, lignite, or the like. Any suitable solid, liquid, or gaseous fuel may be utilized. Oxidant is passed to the calcination unit 300 through oxidant line 306, and the oxidant may include, for example, ambient air or substantially pure oxygen (e.g., from an ASU). The calcination unit may be adapted for or configured for operation at a temperature in the range of, for example, about 700° C. to about 1300° C., about 800° C. to about 1200° C., or about 900° C. to about 1100° C. Operation pressure can be about ambient pressure or can be an increased pressure, such as up to about 2 bar, about 2.5 bar, or about 3 bar. In embodiments wherein calcination unit 300 is operated at an elevated pressure, substantially solids-free gas exiting in line 310 can be expanded in a gas turbine for power generation, and the turbine exhaust gas can be used for a closed looping bottoming cycle to increase the efficiency of any associated power production cycle, such as further discussed below.

In some embodiments, makeup calcium carbonate may be required, and such makeup calcium carbonate can be passed to the calcination unit 300 through line 304. Calcination exhaust gas in line 310 exits the calcination unit 300 and may be passed for further treatment. The calcination exhaust gas typically will contain the significant portion of the gaseous moiety that was initially removed in the contacting unit 100, and the calcination exhaust gas preferably is subject to suitable processing to isolate the removed moiety. For example, the calcination exhaust gas in line 310 may be passed to a separation unit 600 that can be adapted to or configured to separate at least a portion of or substantially all of the removed moiety (e.g., carbon dioxide) from the calcination exhaust gas. As seen in FIG. 1, a substantially pure stream of the removed moiety exits the separation unit 600 through line 602 while any liquid components (e.g., water) exit in line 604. When the chemical moiety is carbon dioxide, the export $CO_2$ can be used for a variety of uses, such as for EOR, chemical production, sequestration, and/or other uses. As illustrated in FIG. 1, prior to passage through the separator 600, the calcination exhaust gas in line 310 may be passed through a heat exchange unit 500 to withdraw heat (504) therefrom for other uses. The cooled calcination exhaust gas then passes to the separator 600. It is understood that the heat exchange unit 500 may be optional, and the gas in line 310 may proceed directly to the separator 600 or to a different intermediate unit for heat exchange prior to passing to the separator. The separator 600 may be a stand-alone unit or may be part of the power production unit 700.

After separation, a substantially pure stream of the removed moiety (e.g., substantially pure $CO_2$) can be compressed and/or pumped in compression/pumping unit 610 to a relatively high pressure (e.g., about 20 bar to about 200 bar, about 50 bar to about 175 bar, or about 100 to about 150 bar) for export from line 612. The compression/pumping unit 610 may comprise only a single compressor, only a single pump, a plurality of compressors, a plurality of pumps, or any combination of one or more compressors and one or more pumps.

Calcium oxide (CaO) exits the calciner 300 through line 308 at an elevated temperature in light of the operation temperature described above. The CaO can be separated from the gas product that exits in line 310 via a separation unit 314 that may be integral to the calcination unit 300 or separate from the calcination unit. The CaO in line 308 may then be cooled down to reduced temperature (e.g., in the range of about 400° C. to about 700° C., about 500° C. to about 700° C., or about 600° C. to about 700° C.). Cooling may be achieved via heat exchange against one or a combination of low temperature steam, oxygen, or $CO_2$. For example, the CaO in line 308 may be passed through heat exchanger 325 against cooling stream 309a to provide an increased temperature stream 309b, which may be used for heat transfer as otherwise described herein for any purpose. Likewise, the high temperature CaO may be cooled by mixing with low temperature, recycled quicklime. If desired, one or more streams may be provided to the calcination unit 300 as a temperature moderator and/or as a fluidization medium. For example, a portion of the water/steam in line 404 (or from an independent supply line) may be diverted to the calcination unit 300 through line 405. Alternatively, or additionally, a portion of the gas product exiting the calcination unit 300 in line 310 may be routed back to the calcination unit through optional line 311 for such purposes. Although water in line 404 is illustrated in FIG. 1 as originating from an independent source, it is understood that the water may originate from the power production unit 700 as shown by the optional, dashed line in FIG. 2.

A portion of the CaO can be exported as a CaO product. For example, substantially pure CaO may be withdrawn in line 312 for use as quicklime. Alternatively, or additionally, a portion of the CaO can be exported from line 402 as a hydrated lime product after undergoing water slaking. The remaining portion of the CaO can be recycled within the chemical looping cycle as discussed below.

Quicklime from the calcination unit 300 reacts with water from line 404 in the slaking unit 400 to form calcium hydroxide, which exits in line 402. In some embodiments, the water in line 404 may be provided as steam. As shown in FIG. 1, a portion of the formed calcium hydroxide may be withdrawn as a product; however, at least a portion of the calcium hydroxide (and optionally substantially all of the formed calcium hydroxide) is passed back through line 406 to the regeneration unit 200 for use in the regeneration reaction to form the alkali solvent. Any suitable slaking unit may be used herein. For example, a slurry detention slaker, paste slaker, ball mill slaker, batch slaker, circulating fluidized bed reactor, transport reactor, bubbling bed reactor, or similar unit may be utilized. Heat released by the reaction in the slaking unit 400 can be used to directly pre-heat $CaCO_3$ in line 208 and/or to provide heating for another system, such as a power production cycle, as further described herein. In one or more embodiments, the slaking unit may be operated in a temperature range of about 125° C. to about 600° C., about 135° C. to about 550° C., or about 150° C. to about 500° C.

As already referenced above, in one or more embodiments, the present systems and methods for direct capture of one or more gaseous moieties (alone or in combination with CaO production) can be combined with a power production cycle. The power cycle may be, for example, a closed loop power cycle or a semi-closed loop power cycle. This combination can be used for the power generation to self-supply the power for at least part of the system or substantially the entire system. The air capture and/or CaO production can be used to provide added heating to the power production cycle, and such heating can come, for example, from the calcination unit and/or the slaking unit. The working fluid used in the power production cycle can be, for example, steam, $CO_2$, or other suitable materials.

Direct gas capture systems can require electricity to run an air capture reactor, gas compressors, and other equipment. Such systems also require low grade heat for steam generation for a $CaO/H_2O$ reaction and high grade heat (e.g., around at least 900° C., or specifically in the range of about 700° C. to about 1300° C., about 800° C. to about 1250° C., or about 900° C. to about 1200° C.) for a $CaCO_3$ dissociation reaction. The electricity and heat for the gas capture system may be produced by a power production cycle, such as an oxy-fired $CO_2$ power cycle. Such integration can be useful to improve the gas capture efficiency and reduce the system cost. Examples of power production systems and methods which may be utilized in the present disclosure are provided in U.S. Pat. Nos. 8,596,075, 8,776,532, 8,869,889, 8,959,887, 8,986,002, 9,062,608, 9,068,743, 9,410,481, 9,416,728, 9,546,815, 10,018,115, and U.S. Pub. No. 2012/0067054, the disclosures of which are incorporated herein by reference. Such systems particularly can utilize $CO_2$ (specifically supercritical $CO_2$) as the working fluid to produce power and heat with full carbon capture. A power production system useful for combination with a gas capture system and/or CaO production system as described herein may comprise, for example, any combination of at least one combustor, at least one turbine, at least one electric generator, at least one heat exchanger, at least one compressor and/or pump, at least one splitter, at least one union, and one or more lines for transfer of fluids between the components/elements of the system.

Figure 2:
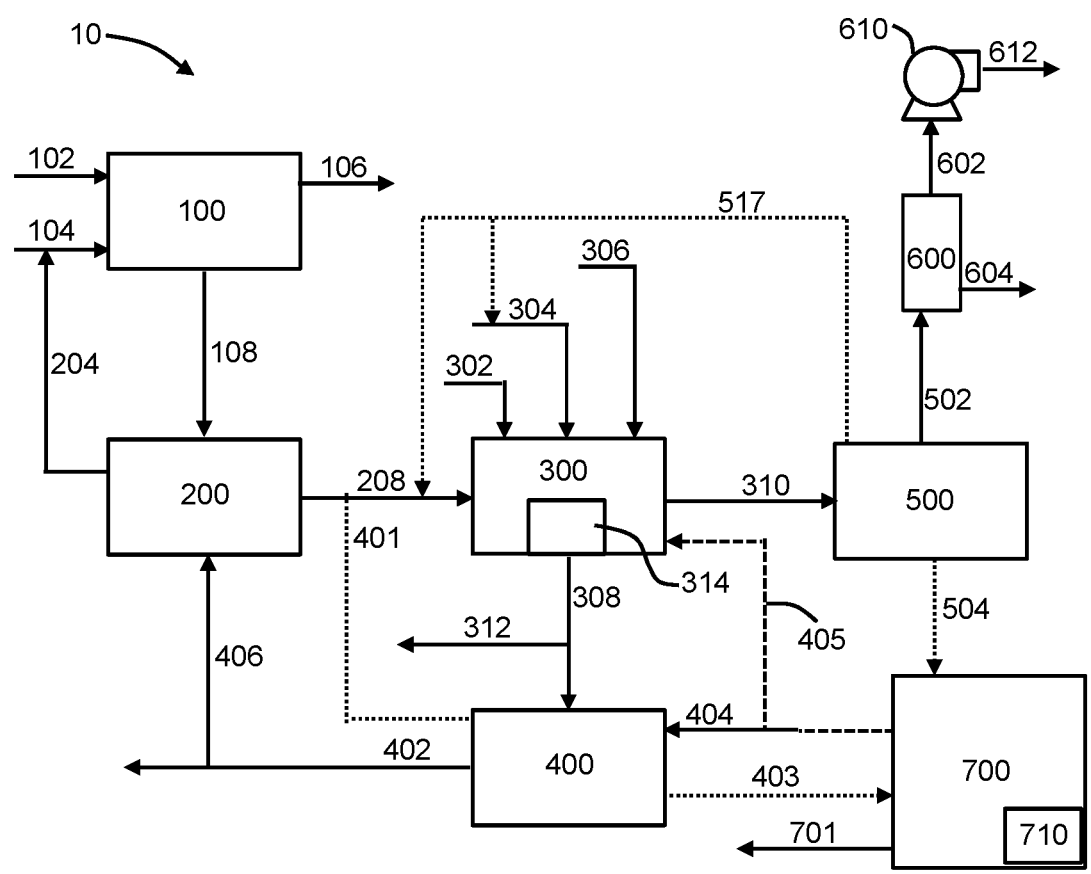
FIG. 2 is a diagram of a system adapted to or configured to remove one or more moieties from a gaseous mixture with associated calcium oxide generation and power production according to example embodiments of the present disclosure.

A system according to example embodiments of the present disclosure combining all of a direct gas capture system, a CaO production system, and a power production system are illustrated in FIG. 2, wherein all references are the same as discussed above in relation to FIG. 1. In some embodiments, heat in the calcination exhaust gas in line 310 can be used for pre-heating $CaCO_3$ (e.g. up to a temperature of about 400° C. to about 800° C., about 500° C. to about 750° C., or about 600° C. to about 700° C.) before $CaCO_3$ in line 208 and/or makeup $CaCO_3$ in line 304 is injected into the calcination unit. This is illustrated in FIG. 2 by the line 517 exiting the heat exchange unit 500 wherein at least a portion of the heat from the calcination exhaust gas in line 310 is withdrawn to be transferred to one or both of the calcium carbonate passing in line 208 and the makeup calcium carbonate provided in line 304. At least a portion of the heat from the calcination exhaust gas in line 310 that is withdrawn in heat exchange unit 500 may be transferred through line 504 for adding heating in the ranges noted above to the power production unit 700. The heat added to the power production unit 700 may be added to one or more streams or components of the power cycle to increase heat in the one or more streams or components. For example, the added heating may be useful for heating a recycle working stream (e.g., carbon dioxide) to near the turbine inlet or outlet temperature. Moreover, the heat can be added to the power production cycle, for example, on a high pressure stream and/or a low pressure stream between a heat exchanger network and a turbine.

Heat may also be added to the power production cycle from further sources. For example, in some embodiments, heat may be withdrawn from the slaking unit 400 through line 403 for passage to the power production unit 700. Whereas the heating in line 504 may be high grade heating, the heating in line 403 may be low grade heating (e.g., in the range of about 125° C. to about 500° C., about 135° C. to about 450° C., or about 150° C. to about 400° C.). As the reaction in formula (5) above is a strongly exothermic reaction, the energy released from the slaking unit 400 is particularly beneficial for being transferred into the power production unit 700. In one or more embodiments, exhaust streams in both gas phase steam and solid phase can be directed via line 403 into a heat exchanger network in the power production unit 700 to preheat a recycled working fluid in a semi-closed power production system and/or for generating high temperature, high pressure steam and/or $CO_2$ for a closed loop power production system.

In one or more embodiments, the calcination exhaust gas in line 310 may be partially cooled in the heat exchange unit 500 (e.g., to a temperature range of about 200° C. to about 600° C., about 250° C. to about 550° C., or about 300° C. to about 500° C.), and that withdrawn heat can be used as described above through transfer in line 517. Thereafter, the cooled calcination exhaust gas may be passed to a single stage or double stage oxy-fired gas re-heater with steam/$CO_2$ tubing inside to raise the temperature up to about 650° C. to about 700° C. to again provide heat for a power generation cycle.

The combination of the power production unit 700 can be particularly beneficial since direct gas capture systems can require a significant amount of electricity to run the necessary gas capture reactor(s), compressor(s), and other equipment. Such systems also require low grade heat for steam generation for a $CaO/H_2O$ reaction and high grade heat (e.g., around at least 900° C.) for a $CaCO_3$ dissociation reaction. The electricity and heat for the gas capture system may be produced by the associated power production cycle, and integration of the power production cycle can improve the gas capture efficiency and reduce the system cost. Moreover, since gas capture systems can specifically be used in capture of carbon dioxide, it is difficult to provide a carbon negative (or even carbon neutral) direct capture system if the electricity needed to operate the system is taken from a grid where the electricity is produced through carbon fuel combustion processes. The present systems and methods can overcome these deficiencies since electricity generated in the associate power production unit 700 can be utilized in the contacting unit 100 to operate components requiring electrical power (as well as any other unit or element of the presently disclosed systems that may require the use of electricity). As seen in FIG. 2, electricity generated in the power production unit 700 can be exported through line 701 to be used by any further unit or component of the system 10 illustrated. Further, in one or more embodiments, the power production cycle may particularly include an air separation unit 710 that can be adapted to or configured to provide low grade heat, such as derived from heat of compression.

In light of the foregoing, the present disclosure particularly can provide systems and methods for direct air capture of carbon dioxide wherein the system is entirely carbon negative, meaning that the overall system removes more carbon dioxide from the air than is generated in relation to any operational aspect of the system. More particularly, this means that the electricity utilized to operate the system is generated in at least a carbon neutral power production cycle and any heating that is required is generated in at least a carbon neutral manner. This is made possible by the foregoing description of the present systems and methods since electricity for operating units/components of the system can be generated in a power production cycle wherein all carbon is captured, since added heating needed for the power production cycle and other aspects of the present system can be recuperated from the calcium looping cycle, and since the air capture components improve the carbon status by removing carbon dioxide from the atmosphere to achieve an overall carbon negative system and method.

Figure 3:
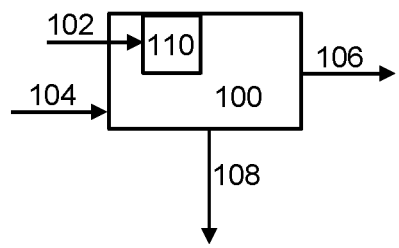
FIG. 3 is a diagram of a contacting unit useful in a system and method according to example embodiments of the present disclosure.

In one or more embodiments, further benefits of the combined systems and methods may also be realized according to the present disclosure. For example, the gaseous mixture in line 102 that is provided to the contacting unit 100 can be preheated for partial $CO_2$ removal by using a solid state $CO_2$ absorbent. This is illustrated in FIG. 3, wherein the contacting unit 100 is illustrated in isolation from the remaining portions of the system. As seen therein, the gaseous mixture in input line 102 may be input to the solid state absorbent unit 110 that is included with the contacting unit 100.

The solid state absorbent unit 110 may be operated, for example, at about ambient temperature, such as in a range of about 10° C. to about 50° C., about 15° C. to about 45° C., or about 18° C. to about 40° C. The solid state absorbent unit 110 may be configured for both absorption of carbon dioxide and sorbent regeneration. During sorbent regeneration, heat or a heated stream may be applied to the solid state absorbent unit to facilitate sorbent regeneration, and such heating may be a temperature of about 90° C. to about 170° C., about 95° C. to about 150° C., or about 100° C. to about 140° C. Heating for the solid state absorbent may be derived from a further component of the overall system(s) illustrated, including any source of heating otherwise described herein. In some embodiments, low grade heat can be taken from a turbine exhaust stream or from an ASU from the power production cycle.

Figure 4:
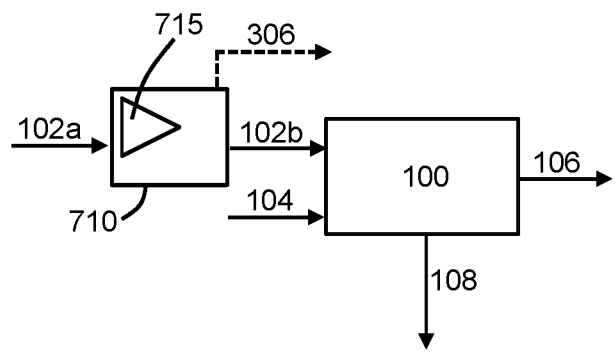
FIG. 4 is a diagram illustrating integration of an air separation unit (ASU) and a contacting unit useful in a system and method according to example embodiments of the present disclosure.
Figure 5:
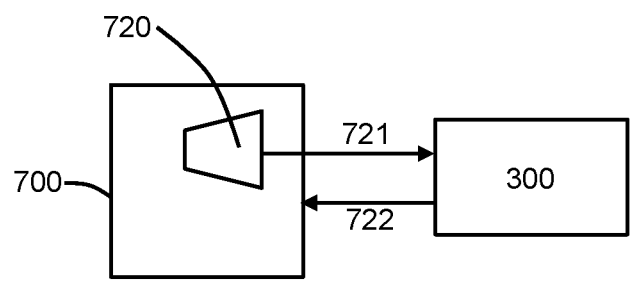
FIG. 5 is a diagram illustrating integration of a power production cycle and a calcination unit useful in a system and method according to example embodiments of the present disclosure.

An ASU from the power production cycle may also be utilized to increase reaction rate in a direct air capture system. As illustrated in FIG. 4, the ASU 710 (which may be a dedicated ASU for the contacting unit 100 or may be the same ASU used in the power production unit 700) may include a main air compressor 715, which can be oversized so as to compress air from line 102a before sending the compressed air in line 102b to the contacting unit 100. The air in line 102b may be at a pressure of at least 2 bar, at least 5 bar, or at least 10 bar (e.g., in the range of about 2 bar to about 20 bar, about 3 bar to about 15 bar, or about 5 bar to about 10 bar). Such pressurization can be effective to increase the reaction rate (i.e., the air capture rate) and reduce the equipment size needed in the contacting unit 100. The oversized main air compressor 715 can produce more low grade heat either for the air capture system or for the power production cycle to increase the power efficiency.

Similar to the above, a single ASU 710 may be utilized to produce oxygen for both the power production unit 700 and the calcination unit 300. As illustrated in FIG. 4, the oxidant line 306 for the calcination unit 300 may originate from the ASU 710.

In some embodiments, heat from further portions of the power production unit 700 may be utilized in the calcination unit 300. For example, a turbine 720 in the power production unit 700 may provide a turbine exhaust stream in line 721 that can be at an elevated temperature (e.g., in the range of about 500° C. to about 1200° C., about 550° C. to about 1000° C., about 600° C. to about 800° C., or about 700° C. to about 750° C.). All or part of the turbine exhaust stream in line 721 can be directed to the calcination unit 300, and a cooled stream may be directed back to the power production system in line 722. Beneficially, only a small amount of natural gas and oxygen may be required for increasing the temperature in the calcination unit 300, such as to a temperature of about 700° C. to about 1200° C., about 800° C. to about 1000° C., or about 850° C. to about 900° C., for $CaCO_3$ dissociation. Therefore, the fuel consumption for the calcination unit 300 can be reduced significantly.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for direct capture of carbon dioxide from air with simultaneous power production and generation of one or both of calcium oxide and calcium hydroxide, the method comprising:
    contacting air with an alkali solvent in a contacting unit under conditions effective to react the alkali solvent with carbon dioxide in the air and form an intermediate product incorporating the carbon dioxide removed from the air;
    regenerating the alkali solvent in a regenerating unit by reacting the intermediate product incorporating the carbon dioxide with calcium hydroxide to form a regenerated alkali solvent and form calcium carbonate;
    heating the calcium carbonate in a calcination unit to form calcium oxide and provide a heated gas stream;
    reacting a portion of the calcium oxide with water in a slaking unit to form calcium hydroxide, at least a portion which is passed to the regenerating unit;
    withdrawing heat from the heated gas stream in a heat exchange unit to form a cooled gas stream; and
    using at least a portion of the heat withdrawn from the heated gas stream in the heat exchange unit to heat one or more streams in a semi-closed loop power production unit configured for repeated compression and expansion of a carbon dioxide working fluid.

2. The method of claim 1, wherein the alkali solvent comprises one or both of potassium hydroxide and sodium hydroxide.

3. The method of claim 2, wherein the intermediate product comprises one or both of potassium carbonate and sodium carbonate.

4. The method of claim 1, comprising recycling at least a portion of the regenerated alkali solvent back to the contacting unit.

5. The method of claim 1, wherein heating the calcium carbonate in the calcination unit comprises injecting a fuel and an oxidant into the calcination unit under conditions effective to at least partially combust the fuel to produce heat.

6. The method of claim 1, further comprising injecting a stream of makeup calcium carbonate into the calcination unit.

7. The method of claim 1, further comprising exporting a portion of the calcium oxide formed in the calcination unit as a calcium oxide product stream.

8. The method of claim 1, wherein the calcination unit is operated at a temperature of 700° C. to about 1300° C.

9. The method of claim 1, further comprising passing the heated gas stream or the cooled gas stream to a separation unit and forming a substantially pure stream of carbon dioxide.

10. The method of claim 9, further comprising compressing at least a portion of the substantially pure stream of carbon dioxide to a pressure of about 20 bar to about 200 bar.

11. The method of claim 1, further comprising cooling at least a portion of the formed calcium oxide prior to reacting a portion of the calcium oxide with water to form calcium hydroxide.

12. The method of claim 1, wherein the slaking unit is operated in a temperature range of about 125° C. to about 600° C.

13. The method of claim 1, wherein at least a portion of the heat that is withdrawn from the heated gas stream in the heat exchange unit is used for pre-heating the calcium carbonate entering the calcination unit.

14. The method of claim 13, wherein the calcium carbonate is heated up to a temperature of about 400° C. to about 800° C.

15. The method of claim 1, further comprising using one or more exhaust streams in a gas phase or a solid phase from the slaking unit to transfer heat to one or more streams in the semi-closed loop power production unit configured for repeated compression and expansion of a carbon dioxide working fluid.

16. The method of claim 1, further comprising using electricity generated in the semi-closed loop power production unit configured for repeated compression and expansion of a carbon dioxide working fluid to supply at least a portion of an electrical load requirement necessary for operation of at least the contacting unit.

17. The method of claim 1, wherein the contacting unit includes a solid state absorbent unit, and wherein the air used in the contacting unit is first passed through the solid state absorbent unit.

18. The method of claim 1, wherein the air used in the contacting unit is first compressed in an air separation unit prior to being passed to the contacting unit.

19. The method of claim 18, wherein the air separation unit is used to produce oxygen for one or both of the semi-closed loop power production unit configured for repeated compression and expansion of a carbon dioxide working fluid and the calcination unit.

20. The method of claim 1, wherein the semi-closed loop power production unit configured for repeated compression and expansion of a carbon dioxide working fluid includes a power production turbine, and wherein all or part of an exhaust stream from the power production turbine is used to provide heating for the calcination unit.

* * * * *